June 23, 1936.  H. H. PEARL  2,045,248
CULINARY VESSEL AND THE LIKE
Filed July 12, 1935
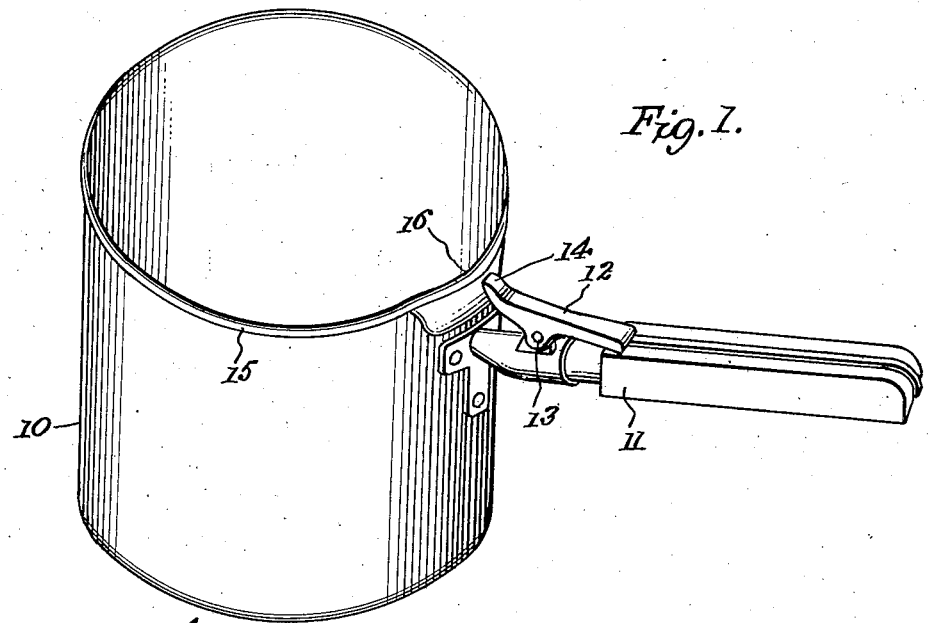
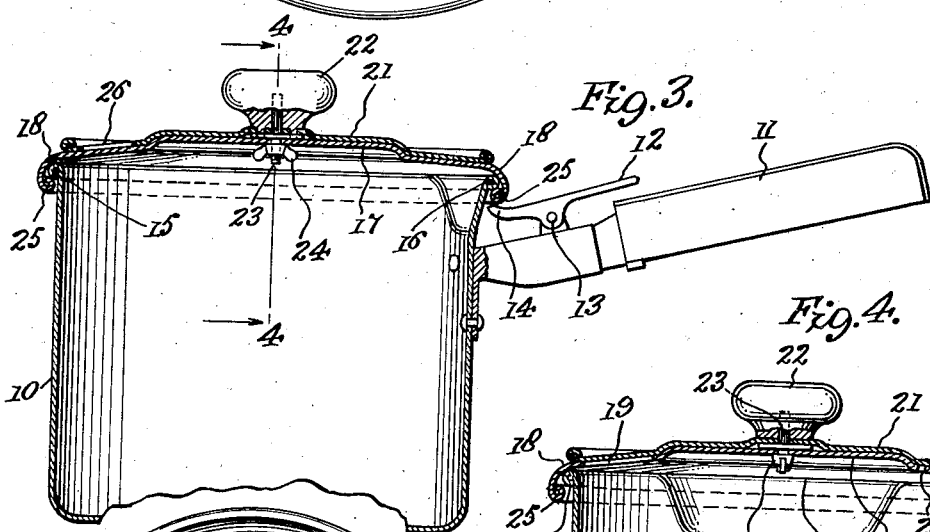
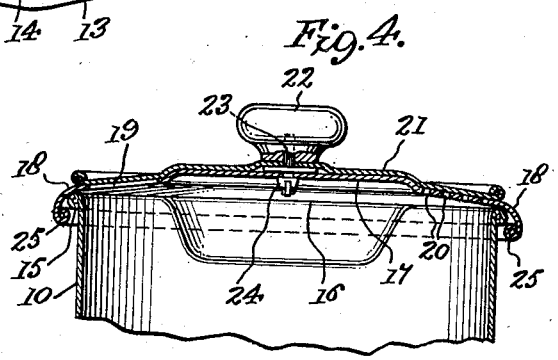
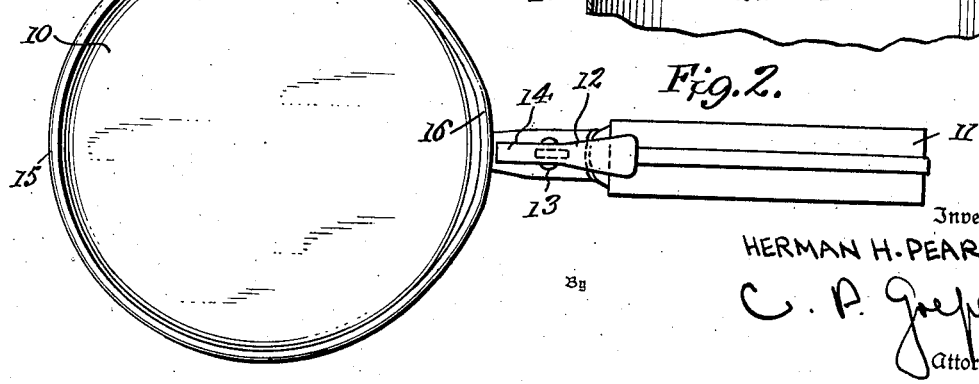
Inventor
HERMAN H. PEARL
Attorney Patented June 23, 1936

2,045,248

UNITED STATES PATENT OFFICE 2,045,248

CULINARY VESSEL AND THE LIKE

Herman H. Pearl, Floral Park, N. Y.

Application July 12, 1935, Serial No. 30,991

5 Claims. (Cl. 53—8)

The present invention relates to culinary vessels and the like, and more particularly to an improved interlock between the receptacle and the cover.

An object of the present invention is to provide a culinary vessel with a cover wherein the edges are provided with beads which interfit one within the other, and wherein both the cover and the receptacle may be made concentric or symmetrical but wherein the interlock is provided by deformation or offsetting of a portion of one bead toward the other, so that when the cover is fitted to the receptacle and pressed down thereupon there will be a tendency to move the cover into eccentric position with respect to the receptacle to provide a yieldably releasing interlock of a cover on the receptacle.

Another object of the invention is to provide a culinary vessel of this type which may be equipped with a cover releasing means and a handle at one side, and wherein the interlocking feature is disposed directly opposite the releasing means so that the removal of the cover will be rendered more easy by operating the releasing means.

A further object of the invention is to provide a receptacle and cover therefor wherein the cover may be turned into any relative angular position upon the receptacle and locked in such position, no particular axially angular relation being required to effect the interlock.

The invention also aims to provide a vessel of this character wherein the receptacle and the cover may be truly cylindrical in shape, where the interlock is localized at a desired point, wherein the interlocking feature is both economical and simple in construction, wherein the interlocking bulge or offset may be provided on one of the members only, and wherein the seating or overlapping flange of the cover, or receptacle, is so relatively arranged that it will fit tight at all points around the edge of the opposite member so as to effectively seal or close the cover on the receptacle.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a detail perspective view of the receptacle having the handle and cover releasing lever, and showing the interlocking structure disposed adjacent the handle and releasing lever.

Figure 2 is a top plan view of the same.

Figure 3 is a vertical transverse section taken through the culinary vessel with the cover in position thereon and secured in place by the interlock of this invention, the section being taken in line with the handle and the releasing lever, and Figure 4 is a fragmentary sectional view taken through the upper portion of the vessel with the cover locked thereon, the section being taken at right angles to the showing in Figure 3 and on the line 4—4 thereof.

Referring now to the drawing, 10 designates the receptacle of the culinary vessel which may be of any suitable construction, size and form, and which in the present instance is shown as of cylindrical shape. Secured to one side of the receptacle 10 and near its upper end is a handle 11 which extends outwardly from the receptacle at a suitable angle and which may be of any desired construction. The handle 11 carries releasing means in the form of a lever 12 which is pivoted at 13 upon the handle and which extends at one end toward the receptacle, and has an upturned finger 14 adapted to engage beneath the cover 20 to lift the same from the receptacle. The opposite end of the lever 12 extends outwardly over the handle 11 and is adapted to be depressed by the thumb or finger for swinging the releasing lever 12 to lift the cover.

The upper edge portion of the receptacle 10 is rolled over to provide a bead 15 of suitable size for reinforcing the receptacle and to form an interlock with the cover. The bead 15 and the adjacent upper portion of the wall of the receptacle 10, adjacent the handle 11 is offset or bulged outwardly as shown at 16 to provide a locking member and this bulge or offset is of relatively small extent circumferentially of the bead 15 and is sufficient only to bind against the inner side of the cover for urging the same toward an eccentric position with respect to the receptacle and to thus frictionally and yieldably hold the cover in locked or closed position upon the receptacle.

As shown in Figures 3 and 4, the culinary vessel is provided with a cover 17 which is of suitable configuration to fit over the top of the receptacle 10 and which is provided at its marginal edge with a downwardly rolled or bent flange 18 adapted to seat upon the upper edge of the receptacle 10 for sealing the cover on the receptacle.

As shown in Figure 4, the cover 17 is provided at one side of the vessel with a pouring opening or slot 19 as is common in this type of vessel. At the opposite side of the vessel the cover 17 is provided with a strainer opening 20 which may comprise a group of perforations or the like through which liquid may readily pour when the vessel is tilted but which is adapted to hold in the body of the receptacle 10 the vegetables, or other substances from which the liquid is adapted to be drained. The cover 17 is provided with a valve or closure plate 21 which fits over the upper surface of the cover for closing the openings 19 and 20 when turned in one position and which is adapted to be axially turned on the cover to expose the openings when it is desired to pour out or drain the contents from and within the receptacle.

A knob or handle 22 is mounted on the upper central portion of the valve plate 21 and has a bolt 23 which extends axially down through the cover 17 and may be removably connected thereto by a wing nut 24 or the like as shown.

The down-turned flange 18 of the cover is provided at its lower portion with an inwardly rolled bead 25 adapted to snap past the bead 15 of the receptacle 10 for yieldingly holding the cover to the receptacle.

As shown in Figure 3, the interlocking member 16 or bulge of the receptacle bead 15 is biased toward the bead 25 of the cover and offers greater resistance to the passage of the cover bead 25 over the bead 15 of the receptacle at the one point or side of the receptacle adjacent the handle 11, as shown in Figures 1 and 3. The effect of this locking member or bulge 16 is that the cover 17 is drawn toward an eccentric or offset position with respect to the axis of the receptacle 10 and its bead 15. This causes a slight deformation in the bead 25 on the cover 17 and draws the bead 25 taut around and beneath the bead 15 of the receptacle. The effect of this action is that the flange 18 is drawn tight down against the upper edge of the receptacle 10 entirely about the circumference thereof and effectively seals and holds the cover in releasably locked position.

The bead 25 of the cover, at the point opposite the bulge 16 is brought immediately over the finger 14 of the releasing lever 12 and holds the free end of the lever down, as shown in Figure 3, so that a slight pressure upon the outer end of the lever 12 lifts the finger 14 against the bead 25 and lifts the latter upwardly and over the bulge 16 of the receptacle. The releasing pressure is thus directly applied to the cover at the point where the locking member or bulge 16 engages the cover bead 25 and thus the release of the cover is accomplished by a relatively slight pressure upon the outer end of the lever 12 while at the same time the locking member or bulge 16 securely holds the cover against accidental removal from the receptacle such as in handling the culinary vessel and during the pouring and draining operations.

From Figure 3, it will be noted that the cover plate 21 is provided at one side of its knob 22 with a slot or opening 26 adapted to be turned into and out of registry relatively to the openings 19 and 20 of the cover 17. As shown in Figure 4 this slot or opening 26 is turned out of registry with the openings 19 and 20 so that the imperforate body portion of the plate 21 effectively closes the openings 19 and 20 to maintain steam and the like in the receptacle.

What is claimed is:—

1. In a culinary vessel, a receptacle having a handle at one side and a cover releasing lever on the handle, said receptacle having a bead at its upper marginal edge and having a bulged portion offset outwardly adjacent the handle and lever, and a cover removably fitting on the receptacle and having a depending bead adapted to engage over the bead of the receptacle, said outwardly bulged portion of the receptacle bead yieldably binding against the cover bead to hold the same in interlocking relation with the receptacle and at a point adjacent said releasing lever.

2. A culinary vessel, comprising a receptacle having a handle at one side and a cover lifting lever mounted on the handle, said receptacle also having an upper marginal bead with an outwardly bulged portion adjacent said handle and lever, and a cover having a marginal bead fitting over the upper end of the receptacle and the beads of the cover and the receptacle being substantially concentric save for the bulged portion of the receptacle, the bead of the cover yieldably engaging over the bead of the receptacle and with said outwardly bulged portion of the receptacle bead binding against the cover bead at a point adjacent said cover lifting lever to yieldably interlock the cover with the receptacle.

3. In a culinary vessel, a receptacle of cylindrical construction having a rolled over bead at its upper edge and the bead and the adjacent upper portion of the receptacle being bulged outwardly to provide a locking member, a handle outstanding from the receptacle below said locking member, a releasing lever pivotally mounted on the handle and having an upturned finger disposed adjacent to said locking member, and a cover detachably fitting over the receptacle and having a downwardly curved annular flange with a rolled bead at the lower edge of the flange, said flange adapted to seat upon the upper edge portion of the receptacle and said bead of the flange adapted to fit over and against the lower side of the bead of the receptacle, said outwardly bulged locking member of the receptacle adapted for binding engagement against the inner side of the cover flange and bead at a point adjacent the finger of the cover lifting lever for yieldably binding the cover to the receptacle and for positioning the locking member adjacent the releasing lever.

4. In a culinary vessel, a cylindrical receptacle, and a cylindrical cover detachably fitting on the upper end of the receptacle, said receptacle and cover having interfitting beads adapted to yieldably hold the cover on the receptacle, said receptacle and its bead being bulged outwardly of the remaining circumference of the receptacle to increase the frictional resistance to removal of the cover from the receptacle at one side of the vessel whereby removal of the cover may be accomplished by a relatively light localized pressure on the cover bead at the said bulged portion of the receptacle.

5. A culinary vessel, comprising a receptacle, a cover for the receptacle, said receptacle and cover having substantially concentric interfitting beads adapted to yieldingly hold the cover to the receptacle, the bead on the receptacle having a bulged outward portion in respect to the remaining circumference of the receptacle for increasing the frictional resistance between the cover and receptacle beads at a localized point in the circumference of the beads, a handle carried by the receptacle at said localized point and a cover lifting lever carried by the handle having a finger at its free end adapted to engage beneath the bead of the cover at its part above the bulged portion of the receptacle bead for applying the lifting force to the cover at a point directly adjacent the said bulged portion of the receptacle bead.

HERMAN H. PEARL.

Patent No. 2,045,248   Granted June 23, 1936

HERMAN H. PEARL

The above entitled patent was extended October 2, 1951, under the provisions of the Act of June 30, 1950, for 5 years and 86 days from the expiration of the original term thereof.

*Commissioner of Patents.*